Dec. 19, 1967  J. RAYNAL ETAL  3,358,783
ABRASIVE RESISTANT ELEMENTS FOR THE VENTS OF ROTATABLE
DRILLING TOOLS AND METHOD OF MANUFACTURE
Filed May 18, 1965  2 Sheets-Sheet 1

INVENTORS
JEAN RAYNAL
SERGE A. GSTALDER
BRUNO RENARD
BY Baron & Thomas ATTORNEYS

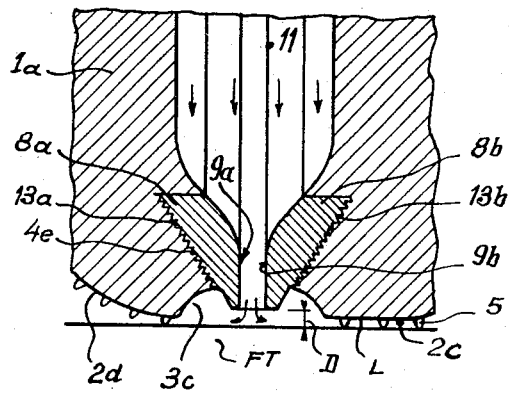
Fig. 4
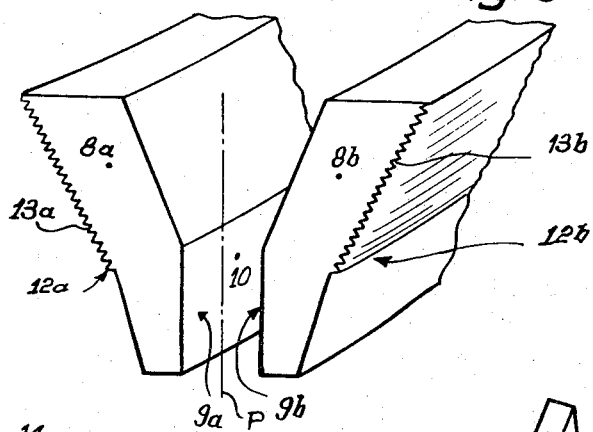
Fig. 5
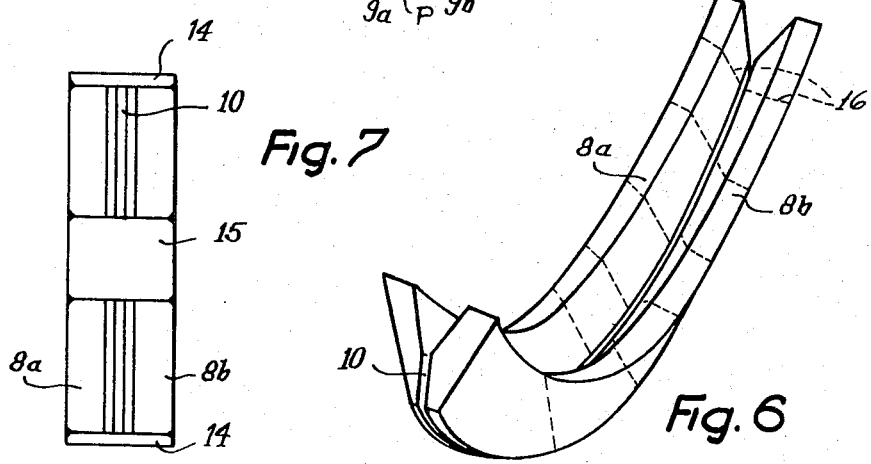
Fig. 7
Fig. 6
INVENTORS
JEAN RAYNAL
SERGE A. GSTALDER
BRUNO RENARD
BY
Bacon & Thomas
ATTORNEYS No. 3,358,783
ABRASIVE RESISTANT ELEMENTS FOR THE
VENTS OF ROTATABLE DRILLING TOOLS
AND METHOD OF MANUFACTURE
Jean Raynal, Serge A. Gstalder, and Bruno Renard, Pau,
France, assignors to Societe National des Petroles
d'Aquitaine, Paris, France
Filed May 18, 1965, Ser. No. 456,772
Claims priority, application France, June 4, 1964,
976,992; Mar. 2, 1965, 7,649
11 Claims. (Cl. 175—393)

ABSTRACT OF THE DISCLOSURE

A rotatable drilling tool having fluid blades of the full body or ring type with a central input conduit for the passage of drilling fluid under pressure, a head having areas provided with cutting elements and areas without cutting elements alternating with said cutting areas, vents for distributing the drilling fluid opening on to the areas and each being connected to the central conduit; the vents being constituted by elements whose resistance to abrasion is greater than that of the matrix of the tool.

---

The present invention relates to improvements in rotatable drilling tools having fluid blades, as well as a method of manufacturing a drilling tool of this type.

The invention relates more particularly to rotatable drilling tools having fluid blades of the full body or ring type, comprising a central input conduit or channel for the passage of a drilling fluid under pressure, a head having areas provided with cutting elements, such as diamonds, cutting edges made of tungsten carbide, or even individual cutting blades, and areas without cutting elements, these areas alternating, and the areas without cutting elements being generally located in a rearward position with respect to the areas having the cutting elements, vents for distributing the drilling fluid arranged in the head perpendicularly to said areas, and opening out on to said area provided with cutting elements and/or on the areas without cutting elements, and each connected to the central conduit or channel of the tool.

It is known that the efficiency of such a tool, i.e. its speed of advance, which is a function of the rotation speed of the tool and of its bearing pressure on the ground, in addition depends on the efficiency of the jet of the drilling fluid which itself depends upon the speed of the drilling fluid at the output of the vent, upon the distance between the lower extremity of the vent and the cutting face, and upon the abrasive properties and the density of the drilling fluid.

In drilling tools of the above mentioned type, the vents do not stand up to the abrasive effects of the drilling fluid for a sufficient time, so that it is not possible to maintain the jet of fluid at a speed corresponding to its maximum efficiency. Moreover, when the vents are situated in the areas having no cutting elements, which areas are generally rearward of the cutting areas so as to allow the drilling fluid to evacuate the swarf and cuttings, the distance between the lower extremity of the vents and the cutting face is sufficiently large so that the efficiency of the jet is further diminished.

The present invention obviates or minimizes all the above mentioned disadvantages and has for a particular object the production of a drilling tool of the above mentioned type, the vents of which have a resistance which is sufficient to allow the use of a speed for the vents, maximum density and abrasiveness of the drilling fluid, compatible with the drilling installation, as well as to permit the arrangement of the vents at a minimum distance from the cutting face, which distance must be kept for a period which is at least as long as the life of the cutting elements of the areas themselves.

To this end, according to the invention, the vents of the rotatable drilling tool having fluid blades are constituted by elements, the resistance to abrasion of which is greater than that of the matrix of the tool and substantially equal to that of the cutting elements.

The elements constituting the vents are preferably embedded in the matrix and extend to the interior of the fluid input conduit or channel, so as to form at least one part of said conduit or channel in its narrow area, and so as to protect the matrix up to an area of the conduit or channel where the speed of the drilling fluid is sufficiently low.

The lower end of each of the vents may protrude beyond the surface of the areas without cutting elements, in which areas said vents are arranged, and are located at a distance from the cutting face which is substantially equal to the distance between the corresponding latitudinal line of the areas provided with cutting elements and the cutting face, i.e. at a distance which is substantially equal to the height of the arrangement of the actual cutting elements themselves.

Each vent may be constituted by two symmetrically matched elements, so as to form a narrow slit, the internal walls of which diverge progressively in an upward direction i.e. the inner end of the vent, and are adapted to the profile of the fluid input conduit or channel.

The external lateral walls of the two elements constituting the vent may be inclined with respect to the plane of symmetry of said elements, and are spaced from the latter from the lower end to the upper end of the vent.

The external lateral walls of the two elements constituting the vent may have, at least on one part, a roughened portion or portions or other unevenness ensuring a good adherence of said elements to the matrix of the tool.

The two elements constituting the vent may be connected to one another at each end of the slit by means of a small closure plate.

The two elements constituting the vent may be connected at certain parts by closure members fixed to the diverged ends of said elements and completely penetrating into the slit determined by said elements.

The elements constituting the vent may extend at least on one part of a meridian of the tool and have the same curvature as said meridian.

Advantageously, for the elements limiting the slit of the vent, two matched series are provided, each comprising a plurality of elements made of tungsten carbide.

The elements constituting the vent, the small closure plates and also the closure members are advantageously made from tungsten carbide.

The present invention also relates to a method of manufacturing the above-mentioned rotatable drilling tool, wherein, before the moulding operation of the matrix of the tool, the elements constituting the vent are connected by spots of welding material, whilst leaving the desired spacing for the slit between these elements; if need be, the smaller closure plates are fixed at each end of the vent and the closure members at the parts on the vent where it is desired to restrict or suppress the flow of the drilling fluid, the passage of the vent is then filled with a suitable paste intended to prevent the closing of said passage by the molten material utilised for the moulding of the matrix of the tool, the vents thus constituted are placed in the mould, and after moulding the matrix of the tool and removal thereof from the mould, the paste closing the vents is removed and the spots of welding material remaining in the vents are destroyed.

In order that the invention may be more clearly understood, reference will now be made to the accompanying drawings which show one embodiment thereof by way of example, and in which.

Figure 1:
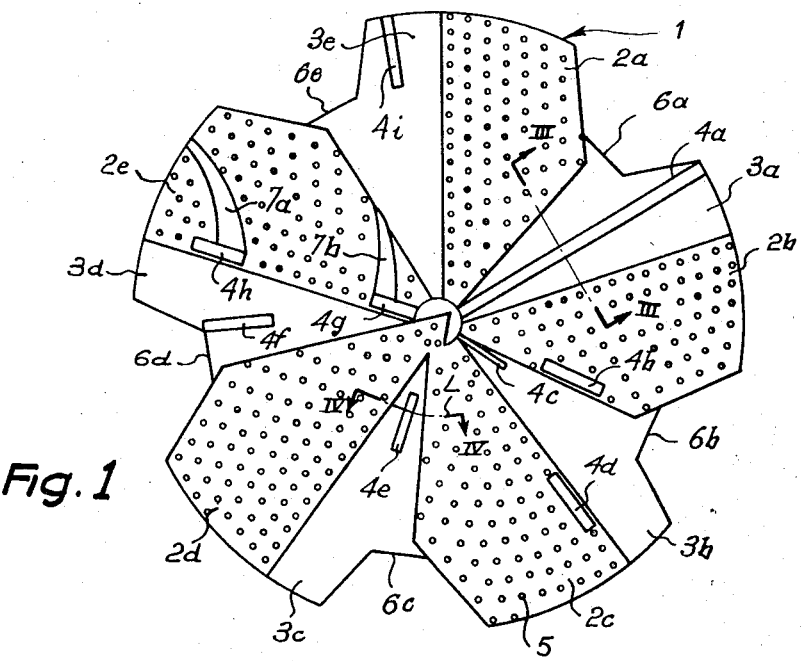
FIGURE 1 shows a view from below of a tool according to the invention.
Figure 3:
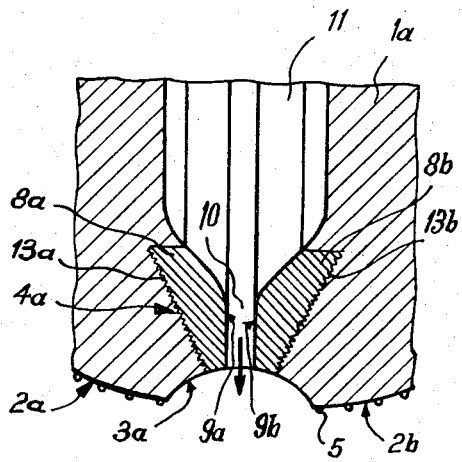

FIGURE 3 shows a partial section along the line III—III of FIGURE 1 of the tool according to the invention, FIGURE 4 shows a partial section along the line IV—IV of FIGURE 1 of the tool according to the invention, FIGURE 5 shows a view in perspective of the elements constituting the vent, extending over one part of a meridian of the tool, FIGURE 6 shows a view in perspective of the elements constituting the vent extending over a whole meridian of the tool, and FIGURE 7 shows a view from above of the elements constituting the vent provided in the middle with a closure member and at each end with a small closure plate.

Referring now to the drawings, as FIGURE 1 shows, a head 1 of a rotatable drilling tool having a fluid blades, a head 1 of a rotatable drilling tool having a fluid blades, comprises a plurality of cutting areas 2a, 2b, 2c, 2d and 2e provided with cutting elements 5, such as diamonds, cutting edges made of tungsten carbide or cutting blades, and alternating with areas 3a, 3b, 3c, 3d, 3e without cutting elements, and having distributing vents 4a, 4b, 4c, 4d, 4e, 4f, 4h, 4i, for the drilling fluid, these vents being connected to a central input conduit or channel for drilling fluid under pressure. The areas 3a to 3e having no cutting elements are generally of a shape which becomes concave towards the top and are set back with respect to the cutting areas 2a to 2e, so as to allow the evacuation of the swarf and drilling cuttings towards the slotted parts 6a to 6e on the periphery of the tool. The vents 4a to 4i are arranged in meridian planes of the tool and open out on the cutting areas 2a to 2e and/or on the areas 3a to 3e having no cutting elements. The vents 4g, 4h arranged in the cutting area 2e are each connected to a spout 7a, 7b arranged in said area and serving to distribute the drilling fluid. The vents extend over at least one part of the meridian on which they are located, but may also extend over the whole length of a meridian as is, for example, the case of the vent 4a. By the term "meridian" will be understood the line of intersection of the revolving surface of the tool and of the surface of a cylinder, a generating line of which passes through the axis of the tool. In the extreme case, when the cylinder has an indefinite diameter, the definition of the term "meridian" then corresponds to the conventional idea of this term, by which is understood the section of a revolving surface through a plane passing through the axis of this surface.

Figure 2:
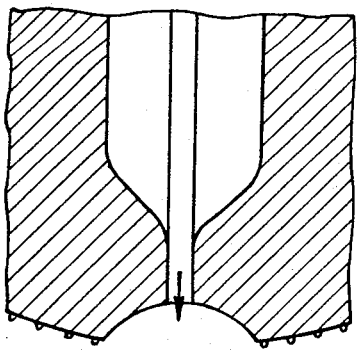
FIGURE 2 shows a partial section of a tool provided with a conventional vent.

FIGURE 2 shows a section of a conventional vent arranged in the matrix of the tool. The profile of the input conduit or channel for the drilling fluid is terminated by a narrow slit constituting the vent, the function of which is to increase the speed of the fluid during its outflow from the tool. This part undergoes a great abrasive action due to the drilling fluid so that the effectiveness of the jet of fluid rapidly diminishes.

As FIGURES 3 to 7 show, according to the invention, each of the vents 4a to 4i is constituted by two elements 8a, 8b, the resistance to abrasion of which is greater than that of the matrix 1a of the tool and substantially equal to that of the cutting elements 5. The vent elements 8a, 8b are symmetrically matched so as to define by their internal juxtaposed walls 9a, 9b, a narrow slit 10 the dimensions of which are calculated according to known precepts in the art of drilling with a jet tool, the upper parts of the internal walls 9a, 9b progressively diverge towards the top i.e., the inner end of the vent, and adapting themselves to the profile of the fluid input conduit or channel 11, in order to protect the matrix 1a in the area of the conduit or channel where the speed of the drilling fluid begins to assume high rates.

In the case of the vent 4a shown in FIGURE 3 which is a partial section along the line III—III of FIGURE 1, the lower extremity of the vent 4a is flush with the area 3a in which said vent 4a is arranged.

According to another embodiment shown in FIGURE 4, which is a partial section along the line IV—IV of FIGURE 1, the lower end of the vent 4e protrudes beyond the surface of the area 3c without cutting elements, and this end is located at a distance D from the cutting face FT, which distance is substantially equal to the distance between the corresponding latitudinal line L of the cutting area 2c and the cutting face. In other words, this distance D is substantially equal to the height of the actual cutting elements 5 themselves. Thus, the jet of fluid leaving the vent 4e is as close as possible to the cutting face, but nevertheless leaves a passage which is concave towards the top for the evacuation of the swarf or cuttings. The distance D between the lower end of the vent and the cutting face may be determined very accurately during the manufacture of the tool. In this way, a necessary passage is effected between the tool and the cutting face, in which passage the speed of the drilling fluid is almost as high as in the slit 10 proper of the vent 4e. The high wear resistance of the elements 8a, 8b constituting the vent, which are, for example, made of tungsten carbide, enables this distance D and dimensions of the slit 10 to be maintained for the whole of the duration of the drilling tool and thus the advance speed of the latter to be considerably increased. The profiles of the internal walls 9a, 9b are shown according to known precepts in this art, in order to admit only a minimum of loss of charge in the vents for a given speed of flow.

The external lateral walls 12a, 12b, of elements 8a, 8b constituting the vent, which walls are intended to be in contact with the matrix of the tool, are inclined with respect to the plane of symmetry P of said elements 8a and 8b and diverge from the lower extremity to the upper extremity of the vent. In order to ensure a complete adherence of the prefabricated elements 8a, 8b, on the matrix 1a of the tool, the external walls of said elements have, at least on one part, roughened parts, grooves, etc., as indicated by 13a, 13b. The elements 8a, 8b constituting the vent have the same lateral and/or vertical incurvation as the meridian of the tool where they are arranged (see FIGURE 6). Of course, the shape of the profile of the elements 8a, 8b may vary according to the profile of the tool selected depending upon the nature of the ground to be drilled, and constituting the cutting face.

As may be seen in FIGURE 7, the elements 8a, 8b constituting the vent may be connected to one another at each end of the slit 10 by means of a small closure plate 14. For a given profile of the elements 8a, 8b, the spacing between said elements defining the passage for the fluid, is calculated according to current requirements in the art of drilling with jet tools. The small closure plates 14 are also made from a substance having a high resistance to wear by abrasion, such as tungsten carbide.

If the hydraulic calculations show that the separation between the two elements 8a, 8b is too small, or if it is desired to establish a particular distribution of the jet according to the profile of the tool, it is also possible to close one part of the slit 10 by closure members 15 fixed to the splayed extremities of the elements 8a, 8b and penetrating into the slit 10 for the whole of the length of the latter.

The method of manufacturing the tool comprising the vents according to the invention is as follows:

Before being placed in the mould, the elements 8a, 8b constituting the vent are matched and assembled according to a method suitable for their nature. In the case of the elements being made of tungsten carbide, they are for example assembled by means of spots of welding material placed between them. The importance of the pre-welding of the two elements 8a, 8b, constituting the vent resides in the fact that in the course of moulding, they strictly retain the pre-determined spacing, despite the various thermal and mechanical stresses to which they are exposed during the moulding operation. This technique enables the spacing of the elements 8a, 8b to be ensured remarkably accurately. If small closure plates 14 and/or closure members 15 are provided, the latter are also fixed to the elements 8a, 8b before being put into position in the mould.

When the matched elements 8a, 8b forming a fluid blade has been assembled, the slit 10 of the fluid passage is filled by a paste for preventing the closing of the slit 10 by the substance utilised for moulding the matrix of the tool.

After this operation, the elements 8a, 8b are placed in the graphite mould at pre-determined positions. Finally, as shown in the art, profiled members made of graphite for ensuring, after their "cleaning," the passage of the drilling fluid to the slit 10, are adjusted according to the profile of the elements 8a, 8b constituting the vents.

After the flowing of the matrix, effected in any method known in the art, the paste is removed from the slit 10 and the spots of welding material connecting matched elements 8a, 8b are destroyed by suitable means.

It may be advantageous to provide for the elements defining the slit of the vent, two matched series each constituted of a plurality of elements made of tungsten carbide as shown by dotted lines 16 in FIG. 6. The method of manufacturing a tool of this type remains the same as that which has been previously described, the only difference being that before the moulding operation of the matrix of the tool, the vent elements of each series of elements are connected together by means of spots of welding material, then the two series of elements are also connected together by means of spots of welding material at a plurality of parts, so as to give the vent slit the desired dimension.

We claim:

1. A rotable drilling tool having fluid blades of the full body or ring type, comprising a central input conduit for the passage of drilling fluid under pressure, a head having areas provided with cutting elements, and areas without cutting elements alternating with said cutting areas and generally being located in a rearward position with respect to the latter, vents for distributing the drilling fluid arranged in the head perpendicularly to said areas and opening out onto said areas and each being connected to said central conduit, said vents being constituted by elements whose resistance to abrasion is greater than that of the matrix of the tool and substantially equal to that of said cutting elements, said elements constituting said vents being embedded in said matrix and extending in one direction to the interior of the fluid input conduit, to form at least one part of said conduit in its narrow area and to protect said matrix up to an area of said conduit where the speed of the drilling fluid is sufficiently low, and extending in the other direction so as to have a lower end protruding beyond the surface of said areas having no cutting elements and in which areas said vents are arranged, said lower end being located at a distance from the cutting face which is substantially equal to the distance between the corresponding latitudinal line of said areas provided with cutting elements and the cutting face, i.e. a distance which is substantially equal to the height of the actual cutting elements themselves.

2. A drilling tool according to claim 1, wherein each said vent is constituted by symmetrically matched elements to form a narrow slit whose internal walls progressively diverge upwardly and are adapted to the profile of said fluid input conduit.

3. A drilling tool according to claim 2, wherein the external lateral walls of said elements constituting the vent are inclined with respect to the plane of symmetry of said elements and diverge from the latter from the lower end to the upper end of said vent.

4. A drilling tool according to claim 3, wherein the external lateral walls of said elements constituting the vent have, at least on one part, roughened portions ensuring a good adherence of said elements to the matrix of said tool.

5. A drilling tool according to claim 4, wherein said elements constituting said vent are connected to one another at each end of the slit, by means of a small closure plate.

6. A drilling tool accordings to claim 5, wherein said elements constituting said vent are connected at certain areas by closure parts fixed to the diverged extremities of said elements and completely penetrate into the slits determined by said elements.

7. A drilling tool according to claim 6, wherein said elements constituting said vent extend at least over one part of a meridian of the tool and have the same curvature as said meridian.

8. A drilling tool according to claim 7, wherein each vent is limited by two matched series of a plurality of aligned elements.

9. A drilling tool according to claim 8, wherein said elements constituting the vent, said small closure plates, and said closure parts, are all made from tungsten carbide.

10. A method of manufacturing a rotatable drilling tool comprising the steps of: connecting elements which are to constitute vents in the tool by a plurality of spots of welding material, leaving the desired space for a slit between said elements; fixing small closure plates to each end of said elements, filling the space between said elements and said closure plates with a pasty substance to prevent the opening being closed by the molten substance used in the subsequent step of molding the matrix of said tool; and after molding said matrix of said tool and removing the same from the mold, removing the paste closing the opening and destroying the spots of welding material remaining on the elements.

11. The method of claim 10 further including the step of fixing closure members to the parts of said vent where it is desired to restrict the flow of drilling fluid.

References Cited

UNITED STATES PATENTS

| 1,133,711 | 3/1915 | Cornelius | 239—591 |
| 1,718,210 | 6/1929 | Armstrong | 76—108 |
| 2,117,388 | 5/1938 | Woolley | 239—592 |
| 3,175,629 | 3/1965 | Rowley | 175—329 |
| 3,215,215 | 11/1965 | Kellner | 175—330 |
| 3,220,497 | 11/1965 | Mori | 175—393 X |

ERNEST R. PURSER, *Primary Examiner.*